(12) United States Patent
Aab

(10) Patent No.: US 8,534,935 B2
(45) Date of Patent: Sep. 17, 2013

(54) DEVICE FOR SYNCHRONIZING SHUTTER BLADES

(75) Inventor: Konstantin Aab, Edermünde-Grifte (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 13/574,691

(22) PCT Filed: Jan. 18, 2011

(86) PCT No.: PCT/EP2011/000187
§ 371 (c)(1),
(2), (4) Date: Jul. 23, 2012

(87) PCT Pub. No.: WO2011/088984
PCT Pub. Date: Jul. 28, 2011

(65) Prior Publication Data
US 2012/0288270 A1    Nov. 15, 2012

(30) Foreign Application Priority Data

Jan. 24, 2010  (DE) .......................... 10 2010 005 432
May 15, 2010  (DE) .......................... 10 2010 020 638

(51) Int. Cl.
*G03B 9/10*       (2006.01)
(52) U.S. Cl.
USPC ....................................................... 396/493

(58) Field of Classification Search
USPC .................................. 396/452, 463, 469, 493
See application file for complete search history.

(56) References Cited

U.S. PATENT DOCUMENTS

| 2,269,400 | A | | 1/1942 | Steiner |
| 2,354,168 | A | | 7/1944 | Aiken |
| 3,075,445 | A | | 1/1963 | Kiper |
| 3,257,921 | A | | 6/1966 | Corey |
| 5,287,140 | A | | 2/1994 | Kohno |
| 5,953,550 | A | * | 9/1999 | Aoshima ........................ 396/458 |
| 5,970,268 | A | * | 10/1999 | Aoshima ........................ 396/469 |
| 6,867,932 | B2 | * | 3/2005 | Noguchi ........................ 359/739 |
| 7,338,221 | B2 | * | 3/2008 | Oishi et al. ..................... 396/458 |
| 7,441,966 | B2 | * | 10/2008 | Kawamoto et al. ........... 396/458 |

FOREIGN PATENT DOCUMENTS

| DE | 969 694 | 7/1958 |
| DE | 10 2009 020 596 A1 | 8/2010 |
| DE | 10 2009 020 287 A1 | 11/2010 |

* cited by examiner

*Primary Examiner* — Clayton E LaBalle
*Assistant Examiner* — Warren K Fenwick
(74) *Attorney, Agent, or Firm* — Foley & Lardner LLP

(57) ABSTRACT

A device for synchronizing shutter blades, which are each fastened to a swivel arm which is mounted rotatably on a swivel pin on a circular-ring-shaped blade carrier, is distinguished in that a synchronizing ring disc (1) is arranged concentrically with respect to the blade carrier within a circle connecting the swivel pins (5) and is coupled in a form-fitting manner to each of the swivel arms (3).

3 Claims, 2 Drawing Sheets

DEVICE FOR SYNCHRONIZING SHUTTER BLADES

Figure 1:
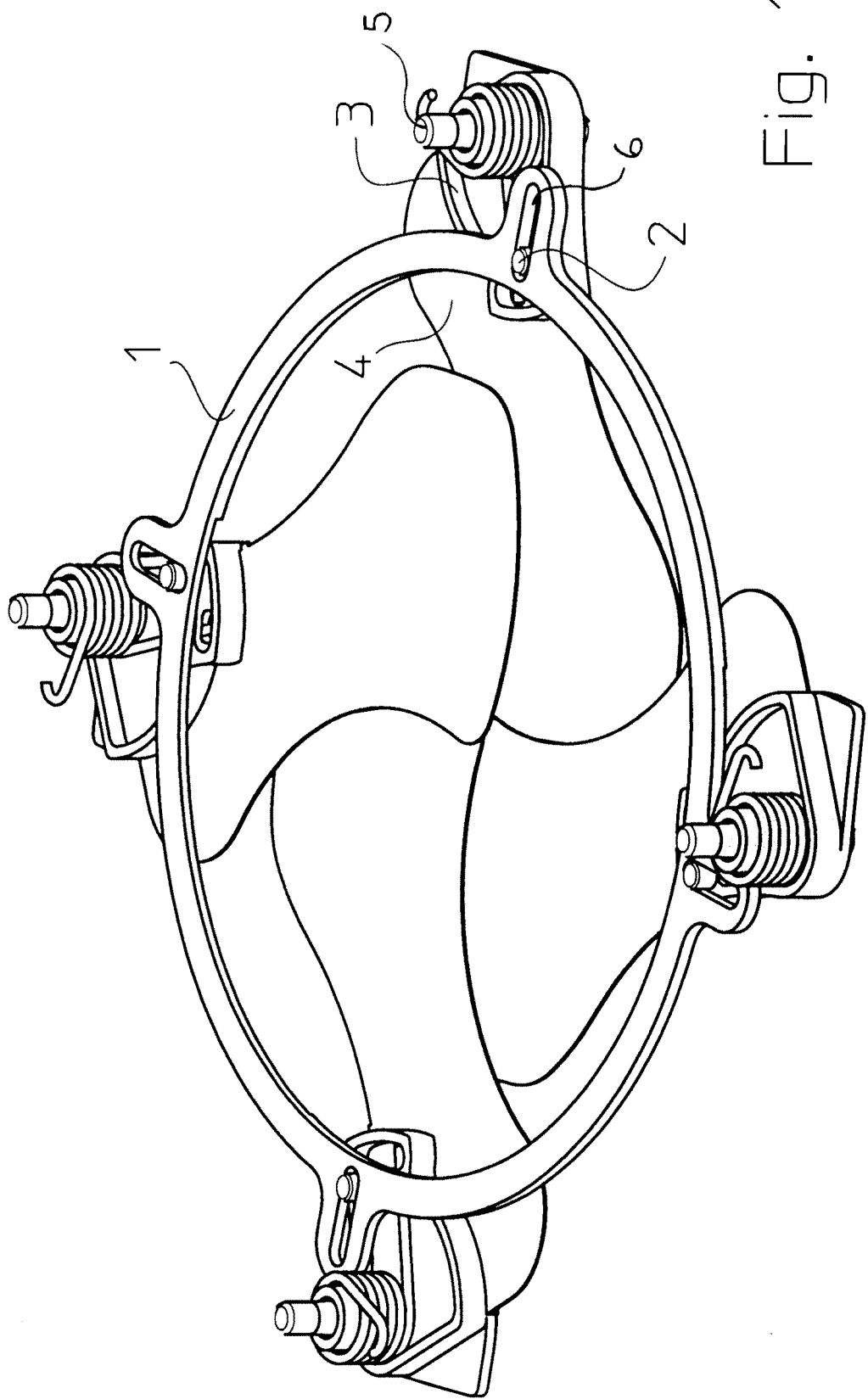

The invention relates to a device for synchronizing shutter blades which are each fastened to a swivel arm which is mounted rotatably on a swivel pin on a circular-ring-shaped blade carrier.

The applicant's earlier patent application 10 2009 020 287.0 discloses a central photographic shutter, in which a plurality of shutter blades are mounted in a swiveling manner on an annular blade carrier.

The shutter blades are fastened to an outer base of a cup-shaped swivel arm. The swivel pin of the shutter blades is inserted into the cup-shaped opening in the swivel arm. An actuating device for triggering the swiveling movement acts on the outer cup edge of each swivel arm.

A spiral spring is inserted into the swivel arm around the swivel pin of the swivel arm, one arm of which spiral spring is fixed to the swivel arm and the other, free arm of which is fastened to the blade carrier. When the shutter blades are swiveled out of the closed position of the central shutter into the open position, the spiral spring is tensioned.

An annular open cam disk is provided as the actuating device for the swiveling movement. During rotation of the cam disk around the shutter opening, the respective flanks of the cams elevate the individual swivel arm to rotate about the swivel pin thereof. The complete opening of the central shutter is achieved when the swivel arms of the shutter blades each rest on a cam head under the tensioning force of the spiral spring. In this position, the rotation of the cam disk may be stopped or carried on continuously. After the end of the retaining function, the swivel arm drops, owing to the tensioning force of the spiral spring, from the cam head down into a cam trough, i.e. back into the closed position of the central shutter.

In the case of a plurality of shutter blades, it is not possible to avoid the tensioning forces of the spiral springs turning out differently. When the swivel arms are elevated and run over the cam heads, frictional forces arise between the cams and the outer cup edge of the swivel arms, said frictional forces depending on the spring forces of the spiral spring as well as on the machining of the material. In the event of very short shutter times, i.e. high actuating speeds of the shutter blades, it can then be observed that the shutter blades execute their resetting movement at slightly different times. The blade leaves, which only slightly overlap in the open position, may become interlocked in the process, which may result in failure of the central shutter.

During the dropping of the swivel arms back into the closed position, the swivel arms strike against a stop at which they come to rest only after brief overshooting, depending on the damping. Temporally different falling-back movements of the different shutter blades may therefore result in the shutter opening being covered nonuniformly.

It was therefore the object of the invention to ensure a uniform movement of the shutter blades.

For this purpose, according to the invention, a synchronizing disk is arranged concentrically with respect to the blade carrier within a circle connecting the swivel pins and is coupled to each of the swivel arms. The coupling takes place via an elongated hole facing radially outward and being integrally formed in the form of a lug on the synchronizing disk. A pin which engages in each case in a form-fitting manner in an associated elongated hole is fitted onto the swivel arms at a suitable location. The position of the pins and the length of the elongated holes are dimensioned in such a manner that, in the closed position of the shutter blades, the pin is located at the radially inner end of the elongated hole and, in the open position, the pin is located at the radially outer end of the elongated hole.

During the installation, the synchronizing ring disk is firstly placed onto the cam disk driving the swivel arms and is secondly covered by ring disks. The synchronizing ring disk is subjected exclusively to tensile and shearing stresses and cannot be elevated in the surface. When a sufficiently tear- and impact-resistant plastic is selected, the synchronizing ring disk can be designed to be very thin and light, and therefore no particular additional forces need to be applied to carry the synchronizing ring disk along during the movement of the shutter blades. The synchronizing ring disk does not carry out any initial actuating function itself but rather, by means of the mechanical coupling thereof of all of the swivel arms, merely compensates for irregular delays in the movement of the individual shutter blades. The removal of an actuating function can be assisted by, in the open position, the swivel arms running against a freely swinging spring leaf which additionally initiates the return of the swivel arms.

An exemplary embodiment is illustrated schematically in the drawing.

Figure 2:
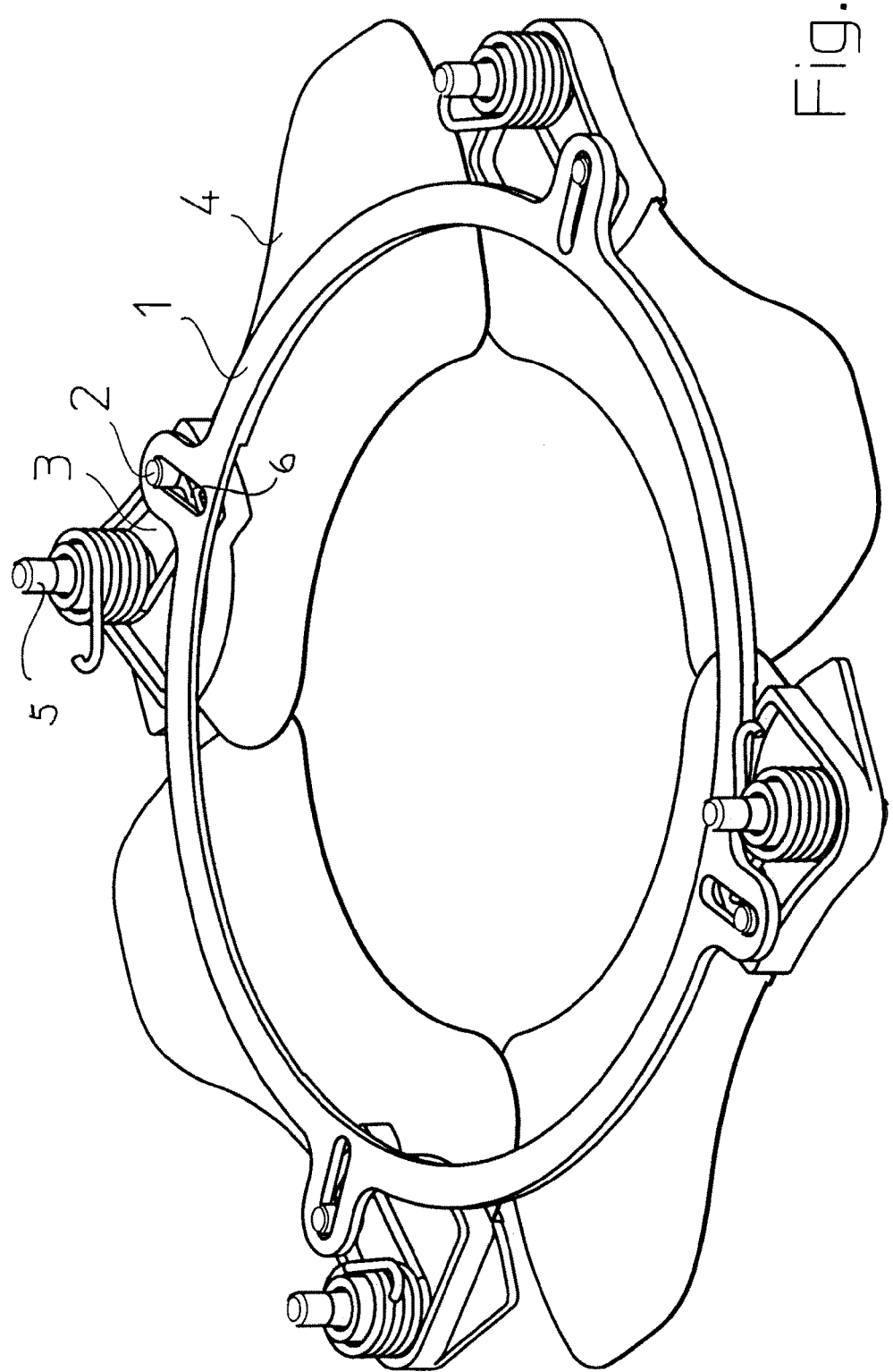

FIGS. 1 and 2 illustrate the synchronizing ring disk 1 in engagement with a pin 2 on a swivel arm 3 in the closed position and in the open position of the shutter blades 4.

The swivel arms 3 are mounted rotatably about swivel pins 5 which are fastened to a circular ring-shaped blade carrier (not illustrated). The pins 2 engage in a form-fitting manner in elongated holes 6 which are integrally formed facing radially outwards in the form of a lug on the outer circumference of the synchronizing ring disk 1. The distance between the lugs with the elongated holes 6 corresponds to the distance between the swivel pins 5 on the blade carrier. The pins 2 are positioned on the swivel arms 3 in such a manner that the lugs which are integrally formed on the synchronizing ring disk 1 and have the elongated holes 6 are rotated away from the swivel pins 5 by means of the pins 2 during the swiveling of the swivel arms 3.

During the swiveling of the shutter blades 4, the pins 2 run to and fro in the radial direction in the elongated holes 9 while the synchronizing ring disk 1 is rotated in a reciprocating manner in the bearing surfaces (not illustrated).

The invention claimed is:

1. A device for synchronizing the pivoting movement of shutter blades which are each fastened to a swivel arm driving a pivoting movement which is mounted rotatably on a swivel pin on a circular-ring-shaped blade carrier, wherein a synchronizing ring disc is arranged concentrically with respect to the blade carrier within a circle connecting the swivel pins and is coupled in a form-fitting manner to each of the swivel arms.

2. The device according to claim 1, wherein an elongated hole directed radially outward in the form of a lug is integrally formed on the circumference of the synchronizing ring disc in a manner corresponding to the distance between the swivel pins.

3. The device according to claim 2, wherein the swivel pins are provided with a pin which is parallel to the swivel pin and engages in a form-fitting manner in an elongated hole, which is assigned thereto, in such a manner that, in a closed position of the shutter blades, said pin is located at the radially inner end of the elongated hole and, in an open position of the shutter blades, said pin is located at the radially outer end of the elongated hole.

* * * * *